United States Patent [19]

Mizukami et al.

[11] 4,437,759

[45] Mar. 20, 1984

[54] CONTACT PRINTER

[75] Inventors: Hidekatu Mizukami, Kyoto; Yoshihiro Machida, Joyo, both of Japan

[73] Assignee: Dainippon Screen Seizo Kabushiki Kaisha, Kyoto, Japan

[21] Appl. No.: 418,379

[22] Filed: Sep. 15, 1982

[30] Foreign Application Priority Data

Sep. 17, 1981 [JP] Japan ............................... 56-145625
Sep. 17, 1981 [JP] Japan ............................... 56-145626

[51] Int. Cl.³ ............................................. G03B 27/20
[52] U.S. Cl. ......................................... 355/91; 355/99
[58] Field of Search ..................... 355/85, 91, 99, 87

[56] References Cited

U.S. PATENT DOCUMENTS

| | | | |
|---|---|---|---|
| 3,560,089 | 2/1971 | Jones | 355/91 X |
| 3,971,691 | 7/1976 | Cairns | 355/85 X |
| 4,029,404 | 6/1977 | Mizukami et al. | 355/91 |
| 4,281,922 | 8/1981 | Matsumoto | 355/99 |
| 4,316,669 | 2/1982 | Tachiki | 355/91 |

Primary Examiner—Richard A. Wintercorn
Attorney, Agent, or Firm—Poms, Smith, Lande & Rose

[57] ABSTRACT

A contact printer in which, when a spring roller is rolled over a transparent plate on which an original plate and a photosensitive material are laid one on another, a flexible airtight sheet wound round the spring roller is extended to cover the transparent plate. The distance between the transparent plate and the spring roller is gradually reduced as the spring roller is rolled rearwards, so that the distance between the transparent plate and the point of contact of the airtight sheet to its own rolled part wound round the spring roller is maintained substantially to a fixed value, thereby contacting the original plate and the photosensitive material onto the transparent plate tightly. A squeeze roller may be provided for squeezing air from a space between the transparent plate and the airtight sheet by rolling thereon. A lower step on which the spring roller and the squeeze roller may be held when the printer is not used, can be formed in the front top end of a frame body.

11 Claims, 6 Drawing Figures

CONTACT PRINTER

BACKGROUND OF THE INVENTION

The present invention relates to a contact printer which is mainly used for plate making, and more particularly relates to a printing frame of a contact printer, on which an original plate and a photosensitive material are mounted one upon another tightly on a transparent plate.

In a conventional contact printer, when the printing is carried out, an original plate and a photosensitive material are laid one upon another on a transparent plate of a printing frame, and are covered by a flexible airtight sheet made of a flexible material such as rubber and plastic material, under vacuum, so as to contact the original plate and the photosensitive material onto the transparent plate one upon another tightly. Then, the contact printing is performed by exposing the light to the transparent plate.

In a conventional semi-automatic contact printer which performs such an operation, the flexible airtight sheet is wound round a spring roller which is biased by a coil spring arranged therein to rotate on its own axis and to roll over the transparent plate, and the free end of the flexible airtight sheet is fixed to the front end of the transparent plate. Hence, the airtight sheet can be extended to cover the original plate and the photosensitive material laid on the transparent plate one upon another, by rolling the spring roller over the transparent plate towards its rear end against the biasing force of the coil spring.

Further, a squeeze roller is arranged before the spring roller and rolls on the airtight sheet together with the spring roller to squeeze air from the space between the airtight sheet and the transparent plate, and then the air in the space between the airtight sheet and the transparent plate is sucked under vacuum, for example, by a vacuum pump.

However, in the conventional printer, since the height of the spring roller rolling over the transparent plate is maintained at the predetermined level, the diameter of the airtight sheet wound on the spring roller is reduced, as the spring roller is rolled over the transparent plate towards its rear end. Thus, the inclined contact angle of the airtight sheet with respect to the transparent plate increases gradually, and the tension of the airtight sheet due to the biasing force of the coil spring also increases gradually, as the spring roller is rolled over the transparent plate rearwards. Accordingly, the squeeze roller is liable to float, and hence it threatens to perform insufficient squeezing of the air from the space between the airtight sheet and the transparent plate.

Further, in the conventional printer, since the spring roller and the squeeze roller are placed on the surface of the transparent plate, it often obstructs the operation during the mount and the demount of the original plate and the photosensitive material, and spoils the appearance.

SUMMARY OF THE INVENTION

It is an object of the present invention to provide a contact printer free from the aforementioned disadvantages and inconveniences, which is stable and reliable and simple in construction.

According to the present invention there is provided a contact printer wherein a spring roller is adapted to rotate on its own axis and to roll over a transparent plate, and wherein a flexible airtight sheet is wound round the spring roller and the free end of the flexible airtight sheet is fixed to the front end of the transparent plate so that the flexible airtight sheet may be extended to cover the transparent plate by rolling the spring roller rearwards, the improvement in that the distance between the transparent plate and the spring roller is gradually reduced by guide means, as the flexible airtight sheet is extended or the spring roller rolls rearwards over the transparent plate, so that the distance between the transparent plate and the point of contact of the flexible airtight sheet to its own rolled part wound on the spring roller is maintained to a fixed value.

The present invention also envisages a contact printer wherein a spring roller is adapted to rotate on its own axis and to roll over a transparent plate, and wherein a flexible airtight sheet is wound round the spring roller and the free end of the flexible airtight sheet is fixed to the front end of the transparent plate so that the flexible airtight sheet may be extended to cover the transparent plate by rolling the spring roller rearwards, the improvement which comprises (a) a lower step formed in the front top of a frame body, (b) a pair of endless chains which are movably mounted to both the sides of the frame body in parallel via sprockets, each endless chain moving approximately in parallel with the transparent plate and vertically under the lower step, and (c) a pair of vertical support bars which support rotatably the spring roller on its ends and whose lower ends are pivotally mounted to the endless chains, wherein, as the endless chains are driven, the vertical support bars and the spring roller can be moved up and down at the lower step and rearwards and frontwards over the transparent plate.

BRIEF DESCRIPTION OF DRAWINGS

In order that the present invention may be better understood, preferred embodiments thereof will be described with reference to the accompanying drawings, in which.

DESCRIPTION OF THE PREFERRED EMBODIMENTS

Figure 1:
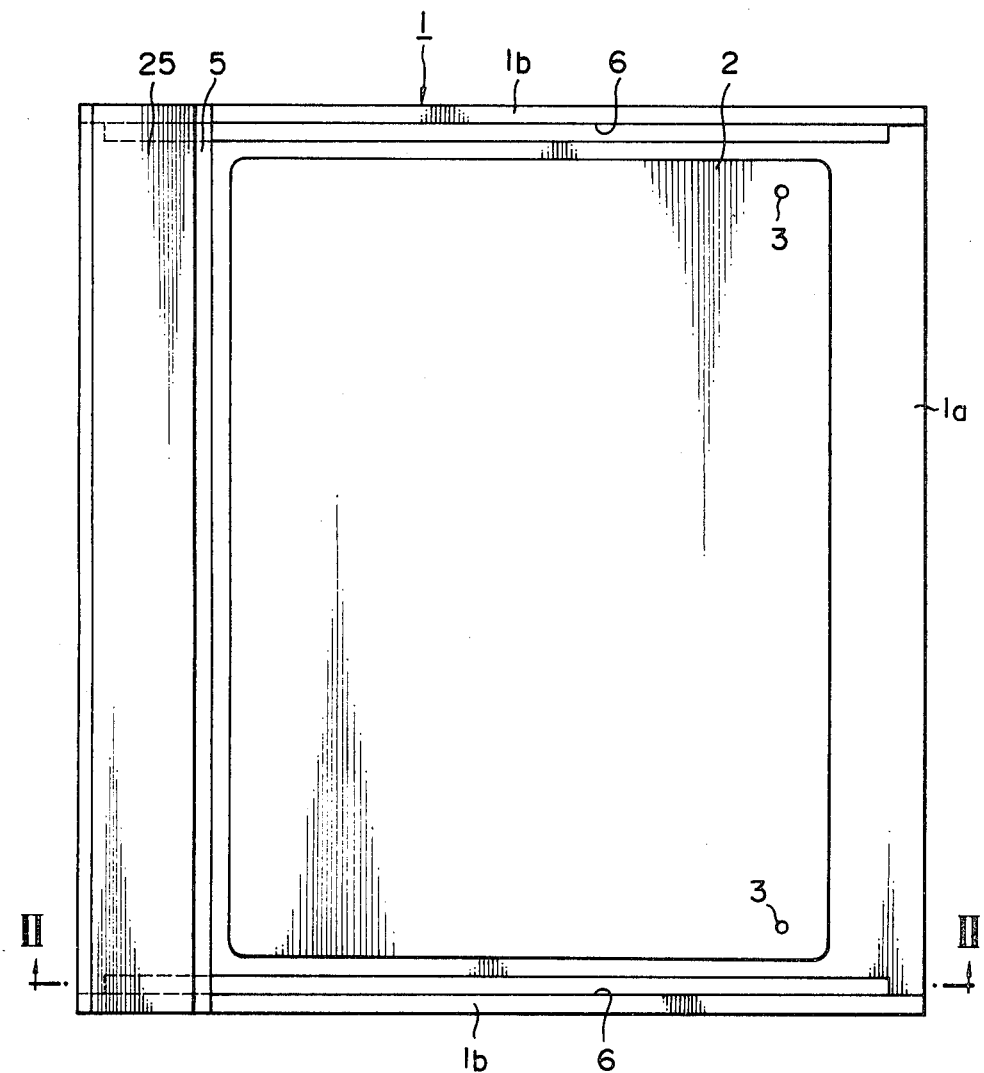
FIG. 1 is an elevational view of one embodiment of a contact printer, before the starting of the operation, according to the present invention.

Referring to the drawings there is shown in FIGS. 1-5 the first embodiment of a contact printer according to the present invention.

A frame body 1 comprising a top plate 1a and a pair of right and left side plates 1b is provided with a transparent plate 2 made of a transparent material such as glass, which is disposed onto the top plate 1a.

Suction holes 3 are formed in the rear side end portions of the top plate 1a and the transparent plate 2, for sucking by a vacuum pump (not shown). A light source 4 for printing is arranged in the frame body 1 in its lower part.

A lower step 5 is formed in the top front end of the top plate 1a of the frame body 1, and a pair of slits 6 are cut in the right and the left side edges of the top plate 1a, extending the front-rear direction.

A pair of partition plates 1c are arranged in the frame body 1 inside the side plates 1b and the slits 6 in parallel with the side plates 1b. A pair of rails 7 are mounted horizontally to the upper outer surfaces of the partition plates 1c at a certain distance away from the outer surfaces of the partition plates 1c.

A pair of upper and lower front idler sprockets 8a and 8b are vertically aligned in a short distance away from each other and are rotatably mounted to the outer surface of each partition plate 1c under the front end part of each rail 7 via horizontal shafts, and a rear drive sprocket 9 is rotatably mounted to the outer surface of each partition plate 1c via a horizontal shaft under the rear end part of each rail 7. An endless chain 10 is extended around the front sprockets 8a and 8b and the rear sprocket 9.

In this embodiment, the top of the rear sprocket 9 is somewhat lower than that of the upper front sprocket 8a, and therefore the transverse upper running of the endless chain 10 is somewhat inclined downward in the rear direction. A chain guide member 11 is mounted to the partition plate 1c just under the transverse upper running of the endless chain 10 in parallel therewith and adjacent thereto.

A moving member 12 of a rectangular form, having four rollers 13 movably mounted to its four corners through pins, is movable on and along the rail 7 while the upper and the lower rollers 13 rotatably support the upper and the lower edges of the rail 7.

Pairs of small rollers 14 are rotatably mounted to the moving member 12 in the upper and the lower inner parts of the upper and the lower front sprockets 8a and 8b and rotatably support a vertical support bar 15 on its front and rear vertical edges. The lower end of the vertical support bar 15 is pivotally mounted to the endless chain 10 via a horizontal pivot pin 16, and the upper end of the support bar 15 projects upwards through the slit 6 and supports an oblong bearing member 17. The right and the left oblong bearing members 17 are connected by a coupling bar 18 on their front upper portions.

Figure 2:
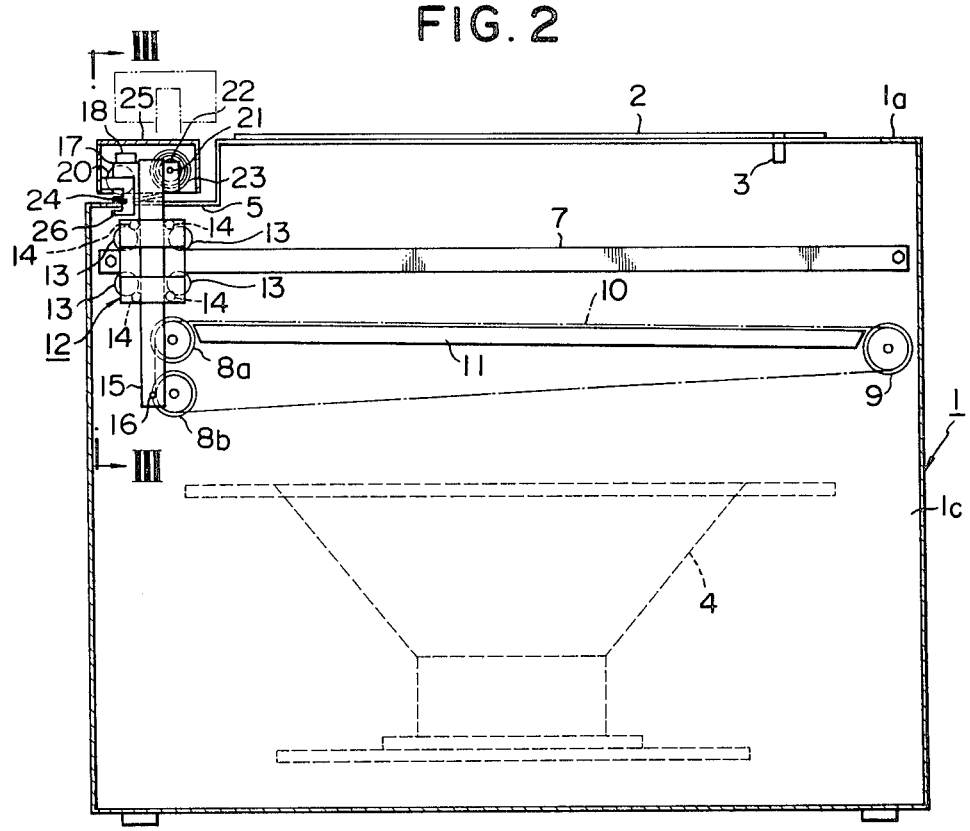
FIG. 2 is a longitudinal cross section, taken along the line II—II of FIG. 1.
Figure 3:
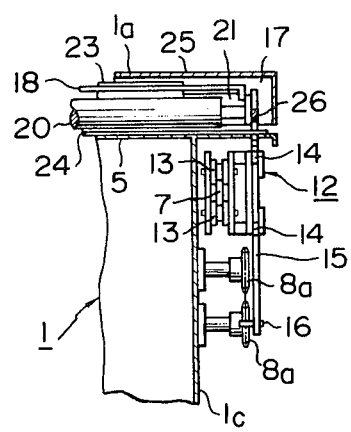
FIG. 3 is a longitudinal cross section, taken along the line III—III of FIG. 1.
Figure 5:
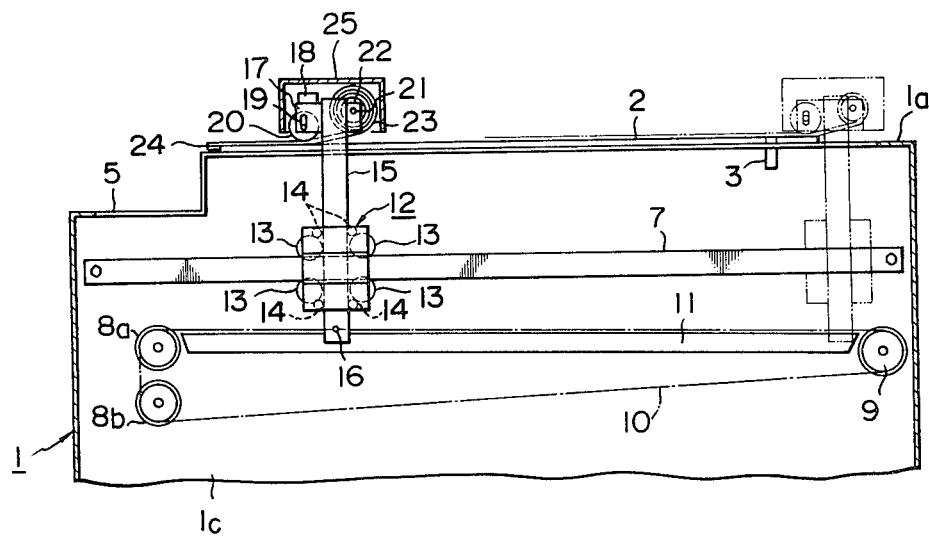
FIG. 5 is a fragmentary longitudinal cross section of the contact printer in operation, wherein hook members are taken away.

The endless chains 10 are so driven by a motor (not shown) connected to the rear drive sprocket 9, as shown in FIGS. 2 and 5, that the pivot pins 16 which connect the endless chains 10 and the vertical support bars 15, may be moved between the front of the lower front sprockets 8b and the just before the rear sprockets 9 through the upper front sprockets 8a.

Accordingly, by moving the endless chains 10 the vertical support bars 15 which are supported by the moving members 12, are moved up and down, and rearwards and frontwards along the rails 7 when the pivot pins 16 are moved between the lower front sprockets and the upper front sprockets, and the upper front sprockets and the rear sprockets.

Each oblong bearing member 17 is provided with a slot 19 extending vertically in its front lower part, as clearly shown in FIG. 5, and a rotary shaft of a squeeze roller 20 is fitted in the slots 19 of the right and the left oblong bearing members 17, so that the squeeze roller 20 may be movable up and down.

A fixed shaft 21 is mounted to and between the bearing members 17 in their rear upper parts, and a spring roller 22 is rotatably mounted on the fixed shaft 21 via a coil spring (not shown) arranged therein, that is, the coil spring biases the spring roller 22 to roll rearwards on its own axis around the fixed shaft 21.

A flexible airtight sheet 23 made of a flexible material such as rubber and plastic material is wound round the spring roller 22, and a belt iron 24 is attached to the lower free end of the flexible airtight sheet 23. A cover 25 having a box-like shape for covering the squeeze roller 20 and the spring roller 22 is secured to the upper ends of the vertical support bars 15. A pair of hooks 26 having a U-shape turned sideways are mounted to the ends of the cover 25.

Now, as shown in FIG. 2, when the horizontal pins 16 connected to the lower end of the vertical support bars 15 are positioned in the front ends of the lower front sprockets 8b, the squeeze roller 20 and the spring roller 22 are positioned in the lower step 5 of the frame body 1. In this position, the belt iron 24 attached to the free end of the airtight sheet 23 engages with the hooks 26, and the squeeze roller 20 pushes the free end of the airtight sheet 23 onto the lower step 5 by its own weight to hold it therebetween. The airtight sheet 23 wound round the spring roller 22 is somewhat apart from the surface of the lower step 5 and thus the airtight sheet 23 is contacted to the lower step 5 at a certain angle.

Then, the endless chains 10 are moved rearwards from the position of FIG. 2, and the squeeze roller 20 and the spring roller 22 are moved upwards together with the vertical support bars 15 until the horizontal pins 16 reach the front end of the upper front sprockets 8a and then they are moved in the circular arc paths until the horizontal pins 16 arrive at the top of the upper front sprockets 8a, as shown by imaginary lines in FIG. 2.

Figure 4:
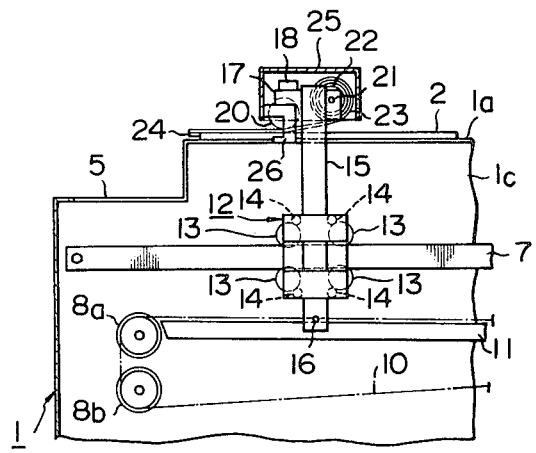
FIG. 4 is a fragmentary logitudinal cross section of the contact printer in operation, of FIG. 1.

Then, as the endless chains 10 are further moved rearwards, the vertical support bars 15 are moved rearwards in the upright positions along the rails 7, and the squeeze roller 20 and the spring roller 22 roll rearwards over the transparent plate 2. On this occasion, as shown in FIG. 4, the belt iron 24 is stopped by the front end of the transparent plate 2 and the airtight sheet 23 is extended to cover an original plate and a photosensitive material (both not shown) laid one upon another on the transparent plate 2, while the squeeze roller 20 squeezes the air from the space between the transparent plate 2 and the airtight sheet 23 by its own weight.

In this embodiment, as shown clearly in FIG. 5 especially by imaginary lines, as the spring roller 22 rolls rearwards, the airtight sheet 23 wound round the spring roller 22 is extended rearwards and its diameter is gradually reduced. However, as described above, since the endless chains 10 are somewhat inclined downwards in the rear direction to compensate such a reduction of the dimeter of the airtight sheet 23, the spring roller 22 rolling rearwards over the transparent plate 2 is gradually lowered, so that the distance between the transparent plate 2 and the point of contact of the flexible airtight sheet 23 to its own rolled part wound round the spring roller 22 may be maintained to a fixed value, and thus the inclined contact angle of the airtight sheet 23 with respect to the transparent plate 2 between the squeeze roller 20 and the spring roller 22 is maintained to a fixed value. In the same time, the squeeze roller 20 rolls on the airtight sheet 23 at a proper pressure regardless of the descent of the spring roller 22 and the vertical support bars 15 since the squeeze roller 20 is movably up and down mounted by fitting its rotary shaft in the slots 19 of the bearing members 17.

Then, when the endless chains 10 are moved in reverse direction, the spring roller 22 rolls up the airtight sheet 23 over the transparent plate 2 and advances frontwards. When the spring roller 22 reaches the front end of the transparent plate 2, the spring roller 22 scoops up the belt iron 24 and then is lowered to the lower step 5 in the reverse way to the above description, as shown in FIG. 2.

It is readily understood from the above description, that the large sized original plate and the photosensitive material can be contacted tightly to the transparent plate by using the contact printer of the present invention. Since the squeeze roller and the spring roller are held in the lower step of the frame body and the top of their cover is in the same height as the transparent plate before the starting of the operation and when the printer is not used, the squeeze roller and the spring roller do not obstruct the operations for mounting and demounting the original plate and the photosensitive material, and further do not spoil the entire appearance of the printer.

According to the present invention, a special hook may be attached to the front end of the top plate 1a of the frame body for stopping the belt iron attached to the airtight sheet.

Figure 6:
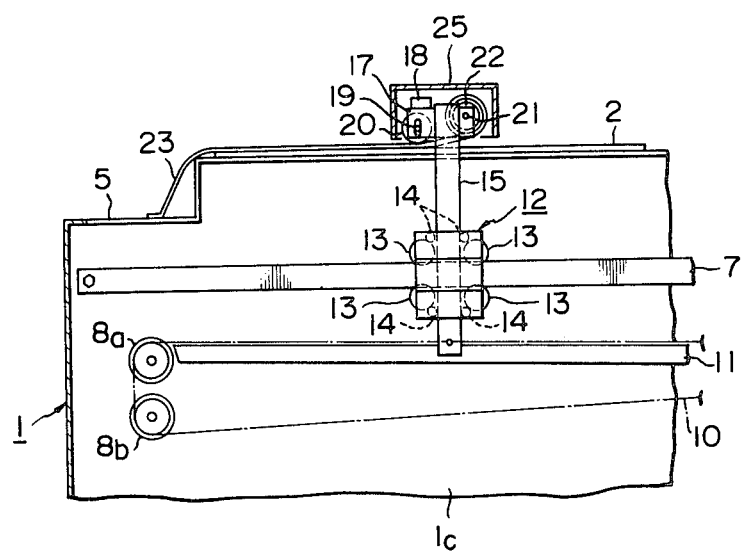
FIG. 6 is a fragmentary longitudinal cross section of the second embodiment of a contact printer in operation according to the present invention.

In FIG. 6 there is shown the second embodiment of the contact printer according to the present invention, wherein the same numerals denote the same elements as those of FIGS. 1–5 and thus their explanations can be omitted, as occasion demands.

In this embodiment, the belt iron 24 and the hooks 26 of the first embodiment described above are omitted and the free end of the airtight sheet 23 is directly fixed to the lower step 5 of the frame body 1. The same functions and effects as those of the first embodiment can be obtained.

Although the present invention has been described in terms of the preferred embodiment reference to the accompanying drawings, various changes and modifications can be made by those skilled in the art, without departing from the scope of the present invention.

What is claimed is:

1. A contact printer wherein a spring roller is adapted to rotate on its own axis and to roll over a transparent plate, and wherein a flexible airtight sheet is wound round the spring roller and the free end of the flexible airtight sheet is fixed to the front end of the transparent plate so that the flexible airtight sheet may be extended to cover the transparent plate by rolling the spring roller rearwards, the improvement in that the distance between the transparent plate and the spring roller is gradually reduced by guide means, as the flexible airtight sheet is extended or the spring roller rolls rearwards over the transparent plate, so that the distance between the transparent plate and the point of contact of the flexible airtight sheet to its own rolled part wound round the spring roller is maintained substantially to a fixed value.

2. A contact printer as defined in claim 1, wherein the guide means comprises a pair of rails which are horizontally arranged in both sides of a frame body and extend in the front-rear direction; a pair of moving members, each being movably mounted to respective rail and movable frontward and rearward along the rail; a pair of vertical support bars, each being supported by respective moving member and movable up and down, which support rotatably the spring roller in their upper rear end portions; and drive means which so moves the vertical support bars frontward and rearward together with the spring roller that the vertical support bars may be somewhat lowered gradually in the rear direction, thereby gradually reducing the distance between the transparent plate and the spring roller.

3. A contact printer as defined in claim 2, wherein the drive means comprises a pair of endless chains to which the respective vertical support bars are connected and whose horizontal upper running parts are somewhat inclined downwards in the rear direction.

4. A contact printer as defined in claim 1, further comprising a squeeze roller which is rolled on the flexible airtight sheet together with the spring roller so as to squeeze air from a space between the transparent plate and the flexible airtight sheet by its own weight.

5. A contact printer as defined in claim 4, wherein the squeeze roller is movable up and down.

6. A contact printer as defined in claims 1, 4 or 5, further comprising a lower step formed in the front top of a frame body; a pair of endless chains which are movably mounted to both the sides of the frame body in parallel via sprockets, each endless chain moving approximately in parallel with the transparent plate and vertically under the lower step; and a pair of vertical support bars which support rotatably the spring roller on its ends and whose lower ends are pivotally mounted to the endless chains, wherein, as the endless chains are driven, the vertical support bars and the spring roller can be moved up and down at the lower step and rearwards and frontwards over the transparent plate.

7. A contact printer as defined in claim 6, wherein a belt iron is attached to the free end of the flexible airtight sheet and is stopped by the front end of the transparent plate or a stop piece mounted to the top plate of the frame body, and wherein a hook is provided to the upper front of each vertical support bar and is engageable with the belt iron.

8. A contact printer wherein a spring roller is adapted to rotate on its own axis and to roll over a transparent plate, and wherein a flexible airtight sheet is wound round the spring roller and the free end of the flexible airtight sheet is fixed to the front end of the transparent plate so that the flexible airtight sheet may be extended to cover the transparent plate by rolling the spring roller rearwards, the improvement which comprises:

(a) a lower step formed in the front top of a frame body;
(b) a pair of endless chains which are movably mounted to both the sides of the frame body in parallel via sprockets, each endless chain moving approximately in parallel with the transparent plate and vertically under the lower step; and
(c) a pair of vertical support bars which support rotatably the spring roller on its ends and whose lower ends are pivotally mounted to the endless chains, wherein, as the endless chains are driven, the vertical support bars and the spring roller can be moved up and down at the lower step and rearwards and frontwards over the transparent plate.

9. A contact printer as defined in claim 8, further comprising a squeeze roller which is rolled on the flexible airtight sheet together with the spring roller so as to squeeze air from a space between the transparent plate and the flexible airtight sheet by its own weight.

10. A contact printer defined in claim 9, wherein the squeeze roller is movable up and down.

11. A contact printer as defined in claims 8, 9 or 10, a belt iron is attached to the free end of the flexible airtight sheet and is stopped by the front end of the transparent plate or a stop piece mounted to the top plate of the frame body, and wherein a hook is provided to the upper front of each vertical support bar and is engageable with the belt iron.

* * * * *